United States Patent [19]

Hayward

[11] 4,117,718
[45] Oct. 3, 1978

[54] INTERNAL PRESSURE AND VACUUM MONITORING APPARATUS

[75] Inventor: Gary G. Hayward, Falmouth, Mass.

[73] Assignee: Benthos Incorporated, Falmouth, Mass.

[21] Appl. No.: 815,987

[22] Filed: Jul. 15, 1977

[51] Int. Cl.² .............................................. G01M 3/36
[52] U.S. Cl. ...................................... 73/52; 209/599; 209/597
[58] Field of Search .............. 73/52; 209/111.9, 111.8, 209/80

[56] References Cited

U.S. PATENT DOCUMENTS

| 3,392,829 | 7/1968 | Keinanen | 209/80 |
| 3,802,252 | 4/1974 | Hayward et al. | 73/52 |

*Primary Examiner*—Donald O. Woodiel
*Attorney, Agent, or Firm*—Schiller & Pandiscio

[57] ABSTRACT

An apparatus and method for monitoring the internal pressure or vacuum in a sealed container is provided which measures the amount of deflection of a flexible wall of the container as a function of the internal pressure. The apparatus provides a first electrical signal representative of the distance between a first point on the flexible wall and a first sensing means and a second electrical signal representative of the average of the distances between at least two other points of the flexible wall and second sensing means. The two signals are compared and a third signal indicative of the deflection of the flexible wall is provided.

26 Claims, 18 Drawing Figures

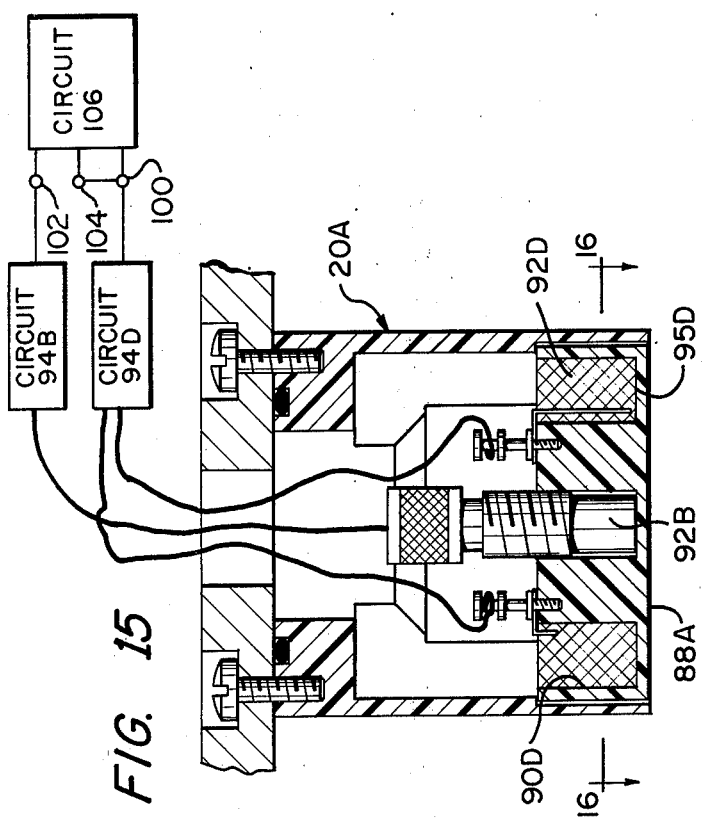
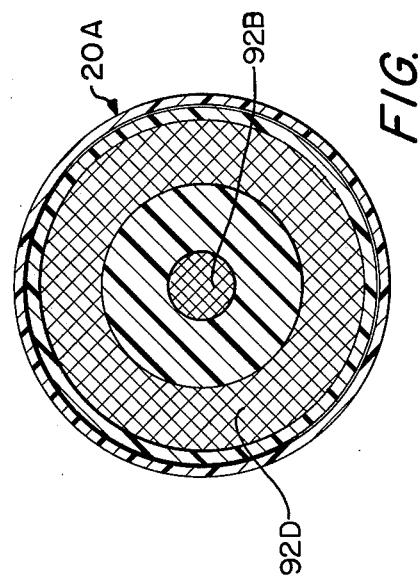
FIG. 15
FIG. 16
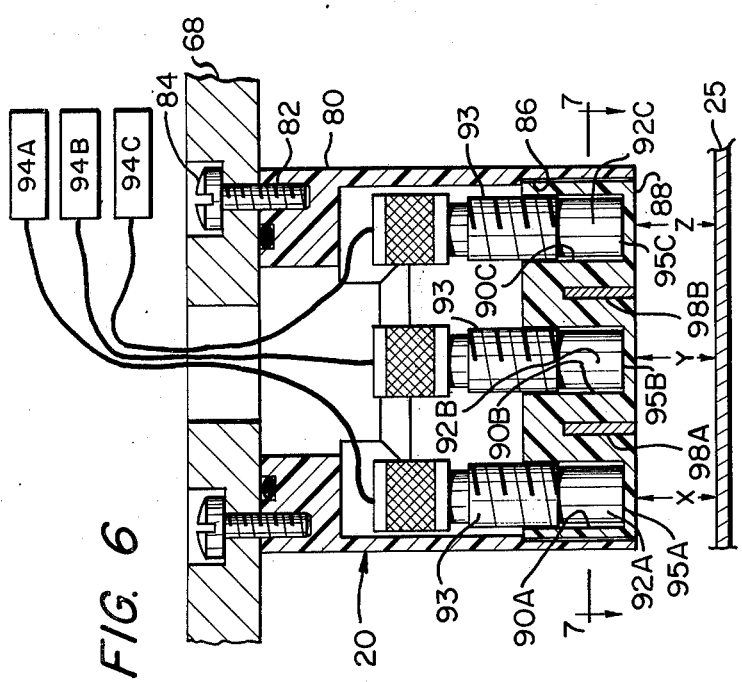
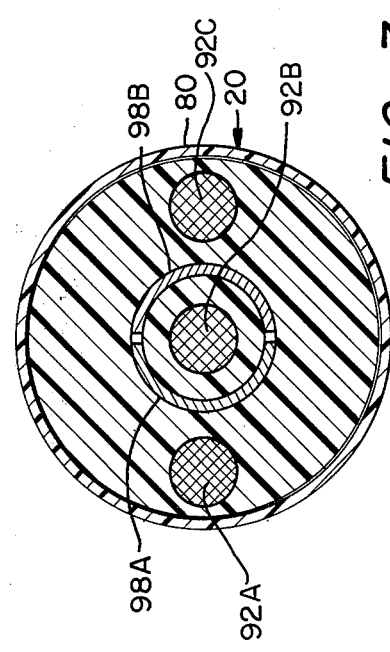
FIG. 6
FIG. 7

INTERNAL PRESSURE AND VACUUM MONITORING APPARATUS

This invention relates to a non-destructive method and apparatus for monitoring the pressure in sealed containers, and more particularly for inspecting pressurized containers, such as (a) vacuum packed jars and cans containing perishable foods or other materials, (b) containers of carbonated beverages, (c) aerosal cans, and the like.

For various reasons it is desirable to inspect these pressurized containers to determine whether they have a desired internal pressure. For example, in the case of vacuum packed food products, it is desirable to determine whether the container has a desired vacuum, since insufficient vacuum or a positive internal pressure may be indicative of something other than a leaky can or insufficient evacuation. Thus the existance of a positive pressure in a container packed under vacuum is often indicative of food spoilage. Likewise, it is also desirable to determine if aerosal cans have a sufficient positive internal pressure and whether or not the contents of carbonated beverage cans have gone flat.

Heretofore, a variety of methods and apparatus have been devised for determining the internal pressure in sealed containers having at least one flexible wall portion, e.g. metal cans and jars or bottles having metal covers, caps or lids.

One such prior art device which has met with commercial success is described in U.S. Pat. No. 3,802,252 issued to Hayward et al on Apr. 9, 1974, to A Pressure and Vacuum Monitoring Apparatus. The device described in the patent and hereinafter generally referred to as the electromagnetic pulse system comprises a transducer coil and means for discharging an electrical pulse through the coil so that the coil produces a pulse of force that will resiliently deflect an adjacent end of a container. The resilient deflection of the can end causes the latter to vibrate and produce an acoustical wave in the container at a resonant frequency that is a function of the internal pressure in the container. This phenomenon occurs since a change in the internal pressure usually causes a change in the deflection of the end of the container (such as by bulging and swelling) which in turn changes the tension on the end of the container which is deflected. As the tension of the end of the can varies, the resonant frequency of the acoustical wave changes. The acoustical energy of the vibrating can is detected and frequency discriminated to determine the resonant frequency so that "bad" containers can be distinguished from "good" containers.

While the electromagnetic pulse system has been found to be quite useful and reliable for its intended purpose, it is not entirely fool proof in discriminating between bad and good containers. Its accuracy is questionable in two different situations. For one thing, it has been discovered that the same tension in an end of a container may be achieved at two different internal pressures, one at a particular vaccum or negative pressure and the other at a particular positive pressure. Because the frequency of the acoustic wave produced by the prior art device would be substantially the same for both conditions, the testing is ambiguous since very clearly one situation might be acceptable while the other might not.

Another example of where the electromagnetic pulse system may be unable to distinguish between good and bad containers is where the container is of the type exhibiting a "dip-tone" effect. Such a container is usually provided with a dome-shaped end or lid. It has been found that when testing such containers with the electromagnetic pulse system, a non-linear tone-pressure response occurs so that, for example, as the pressure decreases from atmospheric the tone or frequency of the acoustic wave produced will at first decrease to a minimum and then increase. This response provides a testing ambiguity in that such a container will exhibit substantially the same tone at relatively low and high vacuums. Prior to the present invention it has been considered necessary to use other types of lids or caps, or to utilize containers having a higher tone region, or to increase the vacuum to higher levels. However, these solutions are not always practical.

Although the above mentioned testing ambiguities may make it difficult to distinguish between good and bad containers, when using the above-described prior art system, it has been observed that due to their flexible nature the container ends, caps or lids will usually physically deflect by different amounts depending upon the internal pressure of the container. Thus, even though an ambiguity may be provided by a container exhibiting the same tonal response at two different internal pressures, the flexible ends, lids or caps of such containers will typically exhibit different amounts of deflection.

In accordance with the present invention sealed containers are tested by inspecting the flexible ends, caps or lids of containers to determine if and how much deflection of the end, cap or lid of each container has occurred.

One device is known in the prior art which is adapted to measure the deflection of the end of a container. The device includes a proximity detector mounted above a conveyor belt. The belt carries the containers in a single file under the proximity detector so that any deflection of the top of a container can be measured. The proximity detector is mounted in a floating manner, being adapted to move up and down so that it can position itself just above and in contact with the top of a container on the belt. More specifically, as each container moves under the proximity detector, the detector is lifted sufficiently to contact the top of the container while allowing the container to slide under the detector. The detector measures the distance between it and the end, lid or cap of the container so as to determine whether any abnormal deflection has occurred.

This prior art device however, suffers from several disadvantages. For one thing, containers moving along with the conveyor belt may be subjected to mechanical vibrations which may cause a container to tilt or move laterally as it passes under the detector, thereby providing an incorrect measurement. Further, since the detector is mounted so that it can move in a vertical direction, any vibrating movement of the container may cause the detector to move or bounce, which can also result in an incorrect reading. Also problems arise from the fact that the distance measured by the proximity detector is mechanically compared since the detector rests upon the top of the container as the container moves under it. This gives rise to situations where incorrect readings can occur. For example, where jars are being inspected, a jar may have a "cocked cap", i.e., the lid of the jar may be loose or tilted causing it to be higher or slightly tilted. As this type of jar passes under the detector, the detector may not recognize the condition of the container. Further, where containers such as cans are provided at their ends with a chine (the sealed ridge formed between the end or lid of the container and its side), the measured distance between the detector and the lid is dependent upon chine height, a dimension which can vary as much as 50 to a 100 mils for typical cans of the same size. This of course provides variations in readings by the proximity detector. Finally, the use of the prior art apparatus employing the single proximity detector does not enable a user to set a lower and upper limits of acceptable pressures, enabling otherwise good containers to be rejected as bad containers, or worse, bad containers to be passed as good containers.

Accordingly, the primary object of this invention is to provide a new method and apparatus for nondestructive testing of the internal pressure in sealed containers. The invention is applicable for testing sealed containers either under vacuum (less than atmospheric pressure) or positive pressure. Thus unless otherwise indicated or rendered obvious by the context in which it is used the term "pressure" is used throughout the specification and claims to denote either a positive or a negative pressure within a container relative to the pressure outside of the container.

A more specific object of the present invention is to provide a new method and apparatus for nondestructive testing of the internal pressure in sealed containers which overcomes the problems of electromagnetic pulse systems of the type disclosed in U.S. Pat. No. 3,802,252 issued to Hayward et al. Accordingly, the present invention can be used either independently or together with this prior art apparatus when inspecting and testing pressurized containers.

Yet another object of the present invention is to provide an improved method and apparatus for measuring the deflection of the ends of containers moving along a conveyor belt to determine the internal pressure of such containers.

Still other objects of the present invention are to provide an improved method and apparatus for determining the internal pressure of containers by accurately measuring the deflection of the ends of the containers substantially independently of mechanical vibrations of the containers or the apparatus, regardless of whether the containers are jars or cans; and also to enable the measurements to be taken within predetermined upper and lower limits of acceptable pressures.

Still other objects of the invention are disclosed in or rendered obvious by the following description of the invention.

Briefly summarized, the method and apparatus of this invention comprises first sensing means for measuring the distance between the first sensing means and a first point of a flexible wall portion of a container being measured and for providing a first electrical signal in response to the measurement, and second sensing means for measuring the average of the distances between the second sensing means and at least two other points of the flexible wall portion spaced from the first point and for providing a second electrical signal in response to the average of the distances. The first and second electrical signals are compared to provide a third electrical signal indicative of the curvature or the amount of deflection of the flexible wall portion at the first point relative to the two other points.

These and other features of the invention are described below with reference to the drawings in which:

FIG. 6 is a sectional view through one embodiment of the deflection measuring unit of the present invention;

FIG. 7 is a sectional view taken along line 7—7 of FIG. 6;

Figure 13:
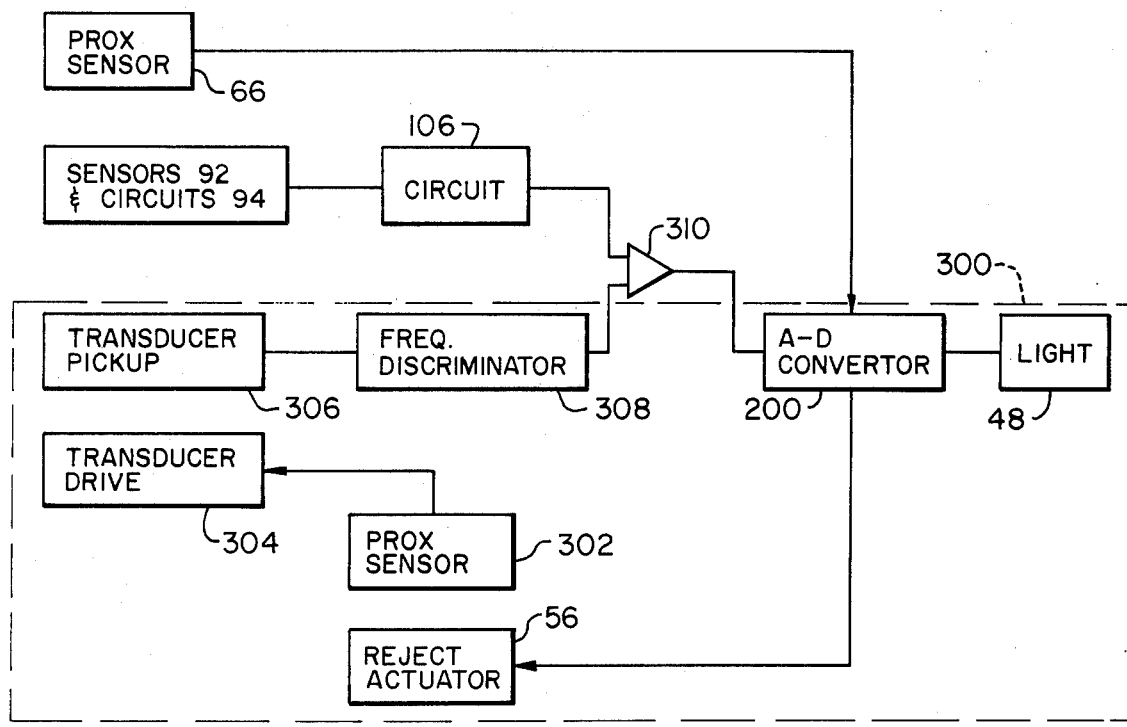
Figure 14:
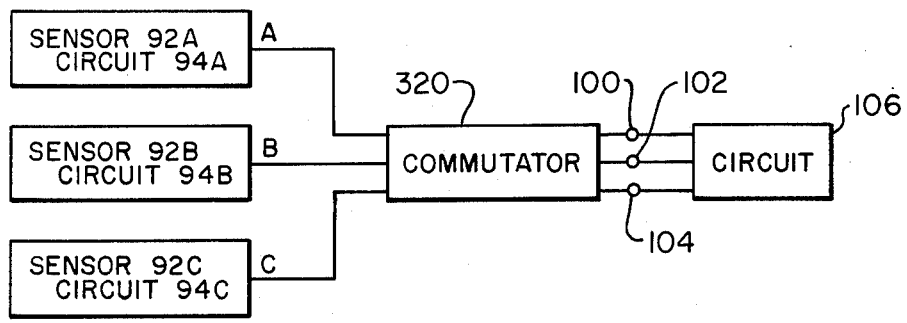

FIG. 13 is a block diagram of a modification in accordance with the present invention of a system designed in accordance with the teachings of U.S. Pat. No. 3,802,252;

FIG. 14 is a block diagram of another modification of the present invention;

FIG. 15 is a sectional view through a second embodiment of the deflection measuring unit of the present invention; and FIG. 16 is a sectional view taken along line 16—16 of FIG. 15.

Figure 1:
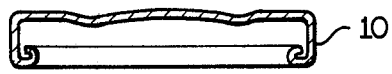
FIG. 1 is a sectional view through a jar cap that will exhibit a dip-tone effect.
Figure 2:
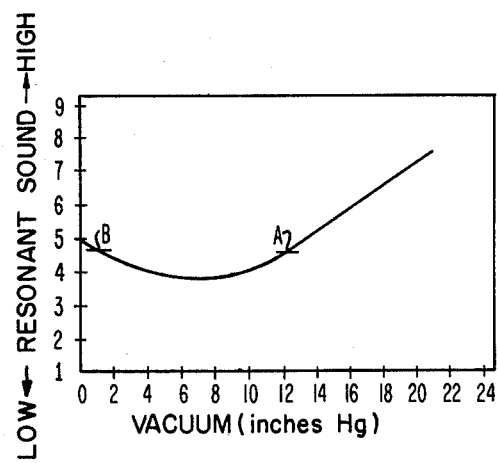
FIG. 2 is a graph illustrating a typical pressure-tone response of a jar cap of the type illustrated in FIG. 1.

FIGS. 1 and 2 illustrate the testing ambiguity which can occur when using the electromagnetic pulse system to test containers which exhibit a "dip-tone" effect. In FIG. 1, a metal cap 10 is shown which will exhibit a dip-tone effect when sealed to a jar. The cap is shown in its normal condition before being used to seal a jar, with its center portion being dome-shaped. A jar provided with such a cap will exhibit a non-linear tone-pressure response similar to the curve shown in FIG. 2. As shown, as the pressure decreases from atmosphere the resonant frequency of the acoustic wave produced by the electromagnetic pulse system will at first decrease to a minimum and then increase. This tone-pressure response thus gives rise to testing ambiguities where a container will exhibit substantially the same tone at relatively low and high vacuums, as shown for example, at points A and B on the curve.

Although the good and bad containers may be difficult to distinguish between when using the prior art system due to the above described testing ambiguities, it has been observed that the ends, caps or lids of these containers will physically deflect by amounts depending upon the internal pressure of the container. Thus, even though an ambiguity may be observed by a container exhibiting the same tonal response at two different internal pressures, the ends, lids or caps of such containers will typically exhibit different amounts of static deflection at those pressures.

Figure 3:
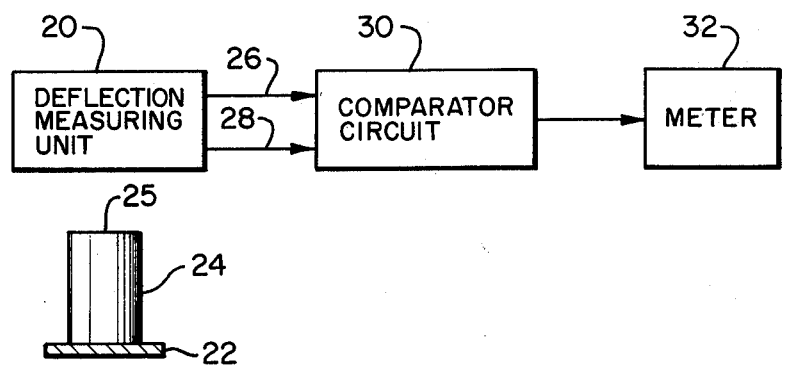
FIG. 3 is a diagram, partially in block form, illustrating the principles of the present invention.

Referring to FIG. 3, there is shown schematically an embodiment of the present invention which is particularly adapted for inspecting the internal pressure of cans, jars and the like on a moving conveyor. This preferred embodiment is designed to measure the deflection of a flexible end of the container being measured so as to provide a proportional indication of the container pressure, i.e., the pressure within the container. This proportional indication feature enables the operator to adjust the rejection point to suit the product being tested. The apparatus generally comprises a deflection measuring unit 20 including at least a first and a second sensing means (not shown) positioned preferably above a belt 22 conveying, for example, cans 24. The first sensing means measures the distance between a first point of a flexible end wall 25 of each can 24, as the latter passes under the unit, and provides a first electrical signal over line 26 to an input of a comparator 30. The second sensing means measures the average of the distances between at least two other points of the flexible end wall of the can spaced from the first point measured by the first sensing means and provides a second electrical signal, in response to the average of the distances, over line 28 to the second input of comparator 30.

Comparator 30 is adapted to compare the first and second electrical signals and provide a third electrical signal in response to the comparison which is representative of the deflection of the flexible end wall 25. The comparator preferably, although not necessarily, includes adjustment means to take into account the normal deflection of the flexible wall of the container such as those encountered for example when measuring lids similar to the dome-shaped lids 10 illustrated in FIG. 1. The output of comparator 30 can be simply read on a suitably calibrated meter 32 as shown, or measured with other similar means, such as that contained in the monitoring unit 40, shown generally in FIG. 4, and described in greater detail hereinafter with respect to FIG. 11.

Figure 4:
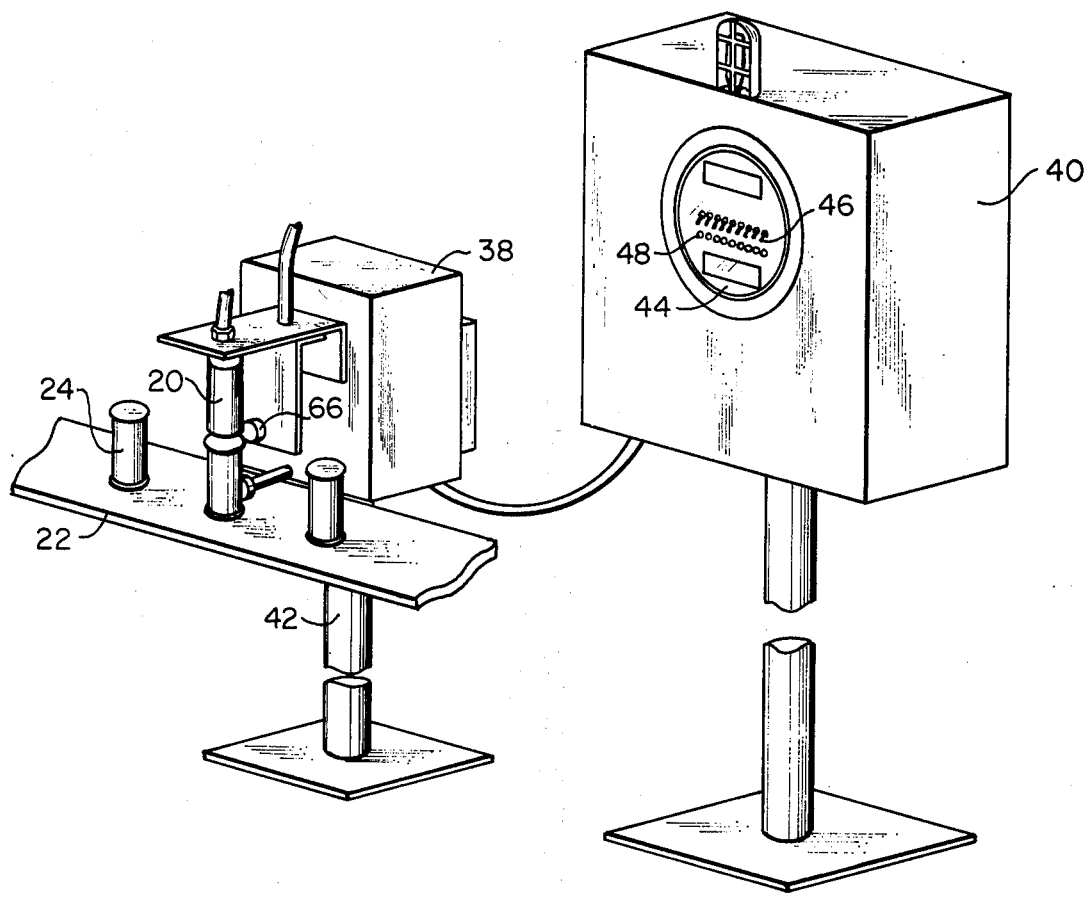
FIG. 4 is a perspective view of an embodiment of the present invention for inspecting containers on a moving conveyor.

Referring to FIG. 4, the preferred embodiment of the present invention is shown as generally including an inspection unit 38 and a monitoring unit 40. The inspection unit 38 houses the deflection measuring unit 20 and is adjustably mounted on a pedastal 42 so that the deflection measuring unit can be positioned just above the conveyor belt 22 while the latter transports cans 24 in a single file. The monitoring unit 40 includes a console 44, the front panel of which is provided with a plurality of toggle switches 46 and a like plurality of lights 48, the latter preferably being light-emitting diodes (LEDs).

Figure 5:
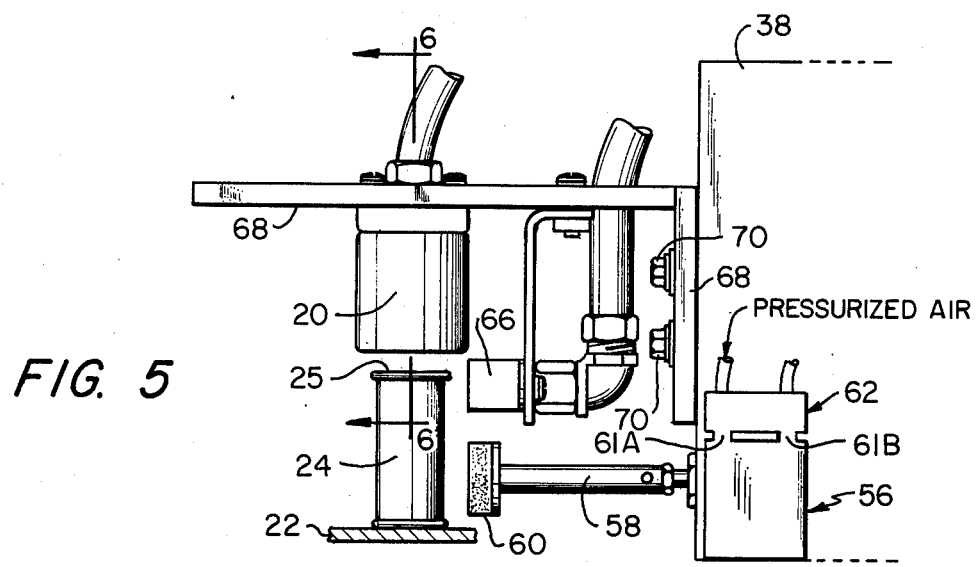
FIG. 5 is an elevational view of a portion of the inspection unit of the embodiment of FIG. 4.

FIG. 5 shows portions of the inspection unit 38 in greater detail. The inspection unit generally includes means, in the form of pneumatic actuator 56, for ejecting cans that have incorrect fluid pressure, a proximity sensing switch 66 for sensing the presence of a can to be inspected, and the deflection measuring unit 20 for measuring the deflection of the flexible end wall 25 of each can 24 as it passes under the unit.

The pneumatic actuator 56 includes a piston rod extension 58 positioned just above and laterally of the conveyor belt 22. Piston rod extension 58 is provided with a resilient bumper 60 that is used to strike and eject bad cans from the conveyor belt. The opposite ends of the cylinder of the actuator 56 have inlet ports that are connected via hose lines 61A and B, respectively, to two of the ports of a four-way solenoid operated valve 62. A third port of the valve functions to vent air while the fourth port is connected to a pressurized air supply (not shown). A solenoid driver suitably connected to the solenoid of valve 62 controls operation of that valve so as to cause actuator 56 to extend its piston rod and cause bumper 60 to throw a measured can off of the conveyor when the deflection measuring unit 20 of the inspection unit senses that it is a "bad" can, as will be described in greater detail hereinafter.

A mounting assembly 68 is attached to inspection unit 38 in any suitable manner, such as mounting screws 70, so as to support the proximity sensing switch 66 laterally and the deflection measuring unit 20 above the conveyor belt 22, as shown. The proximity sensing switch 66 is of a type well known in the art. Generally, switch 66 includes sensing and switching circuitry for sensing the presence of a can 24 when it is substantially beneath the deflection measuring unit 20 and for generating an output signal to indicate such presence. For example, the switch 66 can be a solid-state Di-Prox® Proximity Switch, either one of the models 55525, 55526 or 55527 depending upon the operating voltage (12 VDC. 24 VDC and 5 VDC, respectively) or the current output (100, 500, and 10 ma., respectively) desired, manufactured by Electro Corporation of Sarasota, Fla. Generally, these switches have a typical sensing range of 0.375 inches for 4130 steel and 0.175 inches for aluminum, exhibit no side sensing characteristics (so that metal to the side of or behind the switch will not be sensed), and provide a continuous and nonambiguous output voltage when metal is permanently positioned in the sensing field.

The switch remains off until a can 24 is sufficiently close to be sensed, whereupon the switch will provide an output signal to indicate the presence of the can. Switch 66 is positioned at a distance from belt 24 so that when cans 24 are aligned in a single file, as each can moves under the unit 20, the distance between switch 66 and the positioned can will be small enough so that the switch provides an output signal. After the measurement is made, the measured can is either rejected or continues on the belt. In the latter situation the next can is moved under unit 20. During the interim when one can moves from under unit 20 and another moves in, even if the two adjacent cans contact one another the switch will first turn off before it provides the next output signal indicating the presence of the next can under the unit 20.

Referring to FIGS. 6 and 7, the preferred form of deflection measuring unit 20 includes a hollow housing 80, made of a nonconductive material such as plastic or wood and provided at one end with an annular groove for receiving a sealing O-ring 82 and threaded holes for receiving screws 84 so that the housing can be secured to the mounting assembly 68. The opposite end of housing 80 is counterbored at 86 and sized snugly to receive an end plate 88 which preferably is made of a nonconductive material and is provided with three bores 90A, B and C which extend partially in from the inner surface of the plate. The bores are oriented so that their axes are parallel to one another and preferably, although not necessarily, equally spaced from one another and disposed in the same plane, i.e. in a straight line. The bores 90A, B and C are sized and shaped so as to receive sensing coils 92A, B and C, respectively, in a secure fashion. Preferably, each coil is provided with a screw-threaded outer sleeve 93 adapted to mate with corresponding threads provided in the corresponding bore 90, so that the coils are fixedly secured to end plate 86 with their end faces 95 all lying in the same plane. Coils 92A, B and C form part of and are suitably connected to electronic oscillators provided in control circuits 94A, B and C respectively, each of the latter including its own voltage source. Coils 92 and circuits 94 form a part of deflection measuring unit 20 and provide three separate electrical signals, each indicative of the distance between the face 95 of the particular sensing coil 92 and the closest point of the flexible end wall 25 of the can at the particular instant of time when the measurement is taken. Thus, as shown in FIG. 6, the face 95A of a sensing coil 92A is at a distance X from the flexible end wall 25, the face 95B of sensing coil 92B is at a distance Y from the flexible end wall, and the face 95C of sensing coil 92C is at a distance Z from the flexible end wall.

Figure 8:
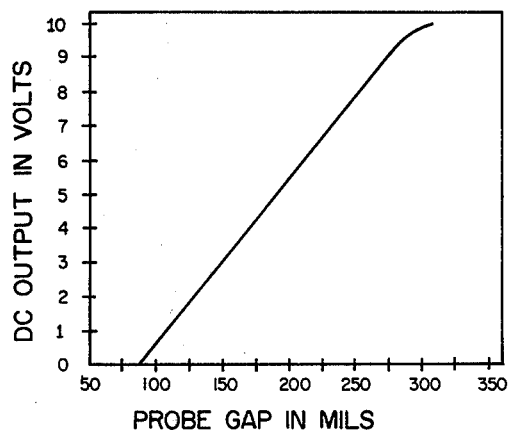
FIG. 8 is an exemplary graphical illustration of a distance-voltage response of a linear proximity detector of the deflection measuring unit of the FIG. 6 embodiment.

Each coil and its associated oscillator circuit are a combination that is well known in the art and is generally designed to provide an output signal with either an amplitude or frequency which is a function of (preferably proportional to) the distance between the face of the coil and the closest point of the can. Preferably, each coil and circuit combination is of a type generally known in the art as a "linear proximity detector", such as the one commercially available from Electro Corporation of Sarasota, Fla. under the trade name "Solid State Linear-Prox Measuring System", using the Model 3622 Sensor. Such a system provides an output voltage or current signal which bears a substantially linear relationship with the distance from the sensor face to the conductive surface being sensed. The control circuit of the system generally includes converter means (not shown) for energizing the sensing coil 92 so as to create a magnetic field around the coil. As the target approaches the sensing coil, it enters the magnetic field and begins absorbing some of the energy from it. As the target approaches the sensing coil, the amount of energy absorbed increases, causing the amplitude of the output signal of the system to decrease. Since the change in the amplitude would otherwise be a non-linear function of the distance of the target, the system also includes a linearizing circuit, such circuits being well known in the art, to provide a substantially linear output versus target distance as exemplified by the graph shown in FIG. 8.

It will be appreciated that other types of sensors can be used to provide an electrical output signal which is a function of the distance from the flexible wall of the container. For example, the sensing coils 92 can each be connected to suitable tuning circuits so that as the distance between the coil and the conductive metal of the can or container varies, the inductance of the coil changes. This produces changes in frequency in the output of the tuning circuit. By measuring the frequency change of the output of the tuning circuit, one can measure the distance between the wall of the can and the end face of the sensing coil. Alternatively, one can use the coil to measure the capacitance between the sensing element and the flexible wall of the can, although this latter technique requires that the conveyor belt 22 be grounded.

In the embodiment of the invention shown, the end plate 88 is also provided with an annular groove extending around the center bore 90B and sensing coil 92B between the center bores 90A and C and coils 92A and C for receiving means in the form of two arcuate, preferably semicircular, magnetically-conductive shields 98A and B, positioned so as to prevent any fields generated by one sensing coil from interferring with the operation of another coil. More specifically, the shields are positioned in the annular groove so that each shield is positioned between the center coil 92B and the adjacent coil. The two shields are spaced from one another (so as to prevent secondary fields from being generated in the shields themselves) preferably at about 90° from the general plane in which the coils are disposed so as to provide maximum shielding.

Figure 9:
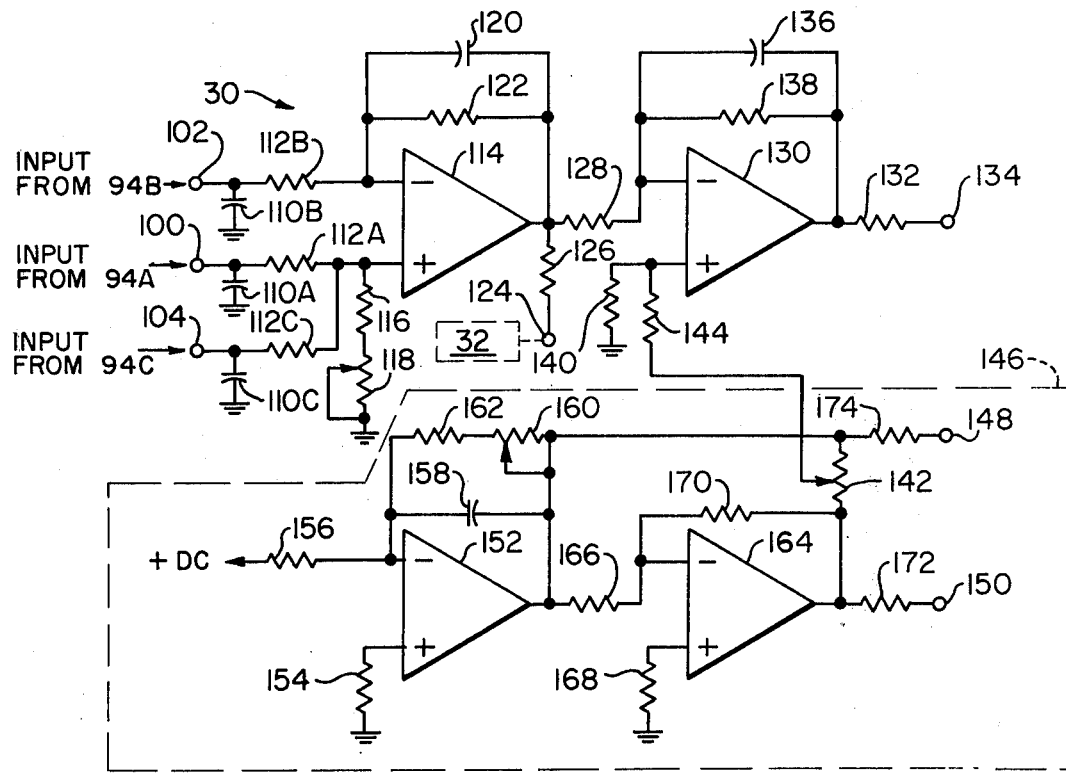
FIG. 9 illustrates a circuit schematic of one embodiment of the signal comparison circuit of the present invention.

Referring to FIG. 9, the outputs of each of the circuits 94A, B and C are connected respectively to the inputs 100, 102 and 104 of the comparison circuit 30. Circuit 30 preferably includes means for averaging the signals received from circuits 94A and 94C so as to provide a reference electrical signal the magnitude of which is proportional to the average of the distances X and Z ($X+Z/2$). Circuit 30 compares this reference signal to the output of circuit 94B, the latter being proportional to the distance Y, so as to provide an electrical output comparison signal which is indicative of the curvature of the flexible wall being measured.

Describing the comparason circuit 30 in greater detail, the input terminal 102 is connected to system ground through capacitor 110B and through resistor 112B to the negative input of differential amplifier 114. Similarly, input terminals 100 and 104 are connected to system ground through the respective capacitors 110A and 110C and to the positive input terminal of amplifier 114 through the respective resistors 112A and 112C. The positive input terminal of amplifier 114 is also connected to system ground through a voltage divider comprising the resistor 116 and potentiometer 118. The output of amplifier 114 is connected to its negative input terminal through both a feedback capacitor 120 and a feedback resistor 122.

The differential amplifier 114 is of a type well known in the art and thus will not be described in detail. Generally, the amplifier is set at unity gain so as to provide an output the polarity and magnitude of which is equal to the difference between the amplitude of the signal appearing at the positive input terminal of the amplifier and the amplitude of the signal appearing at the negative input terminal of the amplifier. Thus, where the two inputs are equal the output of the amplifier will be zero. Where the signal level is greater at the positive input terminal than at the negative input terminal, the output of amplifier is a positive signal the magnitude of which is equal to the difference between the two input signals; and where the signal level is less at the positive input terminal than at the negative input terminal, the output of the amplifier is a negative signal, the magnitude of which is equal to the difference between the two signals. The output of the amplifier 114 is therefore indicative of the curvature of the flexible wall of the container being measured with positive output signals representing a swell in the flexible wall and negative signals representing indentations, while the magnitude of the signal represents the amount of curvature with respect to the swell or indentation.

Figure 10A:
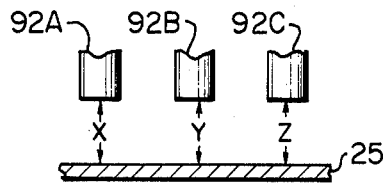
FIGS. 10A, 10B and 10C are schematic illustrations useful in explaining the operation of the embodiment described in FIGS. 4–9.

More specifically, referring to FIG. 10A, if the flexible wall 25 were perfectly flat the average of the distances X and Z, $[(X+Z)/2]$, would equal the distance Y regardless of whether wall 25 were tilted with respect to the sensing coils or not. In such a situation the average of the two signals applied to terminals 100 and 104 will equal the signal applied to terminal 102 and the output of the amplifier 114 zero.

Figure 10B:
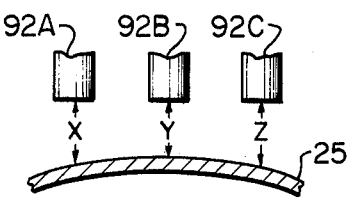

Referring to FIG. 10B where the wall 25 is convex or swelled as caused, for example, by increased pressure in the container or preshaping such as provided by the lid 10 of FIG. 1, the average of the distances X and Z is greater than the distance Y by an amount depending on the curvature of the wall. In such a case the signal applied to input terminal 102 (proportional to the distance Y) will be less than the average of the two signals applied to terminals 100 and 104 (proportional respectively to the distances X and Z). Therefore the magnitude of the signal applied to the negative input terminal of amplifier 114 will be less than the magnitude of the signal applied to the positive input terminal of the amplifier. Accordingly, the output of the amplifier will be a positive signal the magnitude of which is representative of the amount of curvature of the end wall 25.

Figure 10C:
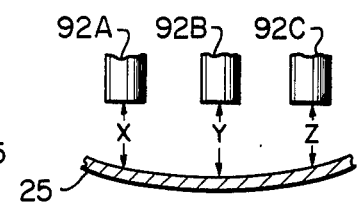

In a similar manner, referring to FIG. 10C where wall 25 is concave so as to form an indentation for example caused by too great a vacuum pressure in the container, the average of the distances X and Z is less than the distance Y by an amount depending upon the amount of curvature. In such a case the signal applied to input terminal 102 will be greater than the average of the two signals applied to terminals 100 and 104. The magnitude of the signal applied to the negative input terminal of the amplifier 114 will therefore be greater than the magnitude of the signal applied to the positive input terminal of the amplifier. Accordingly, the output of the amplifier will be a negative signal, the magnitude of which is representative of the amount of curvature of the end wall 25.

As previously described in FIG. 3, the output signal of the amplifier 114 can be read directly on a meter calibrated to convert the level of the output signal to a value indicative of the amount of curvature of the flexible wall being measured. This can be accomplished by connecting the meter 32 (shown in dotted lines in FIG. 9) to terminal 124, which in turn is connected through resistor 126 to the output of the amplifier 114. As will be evident hereinafter the output of amplifier 114 can be adjusted to take into account the normal amount of deflection of a flexible lid or top which occurs when the container is properly pressurized or evacuated. For example, when testing jars sealed with the dome-shaped lid 10 of FIG. 1, the scaling factor of the output of the amplifier can be changed by adjustment of potentiometer 118 so that the output of the amplifier will be zero when the normal deflection curvature of the lid 10 is measured.

In the preferred embodiment, the output of the amplifier 114 is processed so as to operate with the monitoring unit 40. More specifically, the output of amplifier 114 is connected through resistor 128 to the negative input terminal of a scaling amplifier 130. The output of the scaling amplifier is connected through resistor 132 to the circuit output terminal 134, and through both a feedback capacitor 136 and a feedback resistor 138 to the negative input terminal of the amplifier. The positive input terminal is connected through resistor 140 to system ground and through resistor 144 to the tap of a potentiometer 142 of a DC voltage supply 146. The DC voltage supply 146 is designed to provide an adjustable DC voltage level to the positive input terminal of scaling amplifier 130 and to provide fixed negative and positive D.C. reference voltages at output terminals 148 and 150 respectively for use in the monitoring unit 40, the latter being described in greater detail hereinafter. Supply 146 includes an inverting amplifier 152 having its positive input terminal connected to system ground through resistor 154, its negative input terminal connected through resistor 156 to a positive DC reference source, and its output connected through a feedback capacitor 158 and through the tap of potentiometer 160 and feedback resistor 162 to its negative input terminal. The output of inverting amplifier 152 is also connected through resistor 166 to the negative input terminal of a second inverting amplifier 164 having a gain of −1. The positive input terminal of amplifier 164 is connected through resistor 168 to system ground while the output of the amplifier is connected through feedback resistor 170 to its negative input terminal, through resistor 172 to the positive DC reference voltage output terminal 150 and to one side of the potentiometer 142. The other side of the potentiometer 142 is connected to potentiometer 160 and the output of inverting amplifier 152, and through resistor 174 to the negative DC reference voltage output terminal 148.

The circuit output terminal 134 can be connected to meter 32 so that the meter can give an indication of the internal pressure taking into account the normal curvature of the flexible wall measured. Preferably, however, the circuit output terminal 134 is connected to the signal input terminal of a multiple discriminator or indicator circuit provided in the monitoring unit 40 for operating the indicator lights 48 (FIG. 4) and for operating the can rejector actuator 56.

Figure 11:
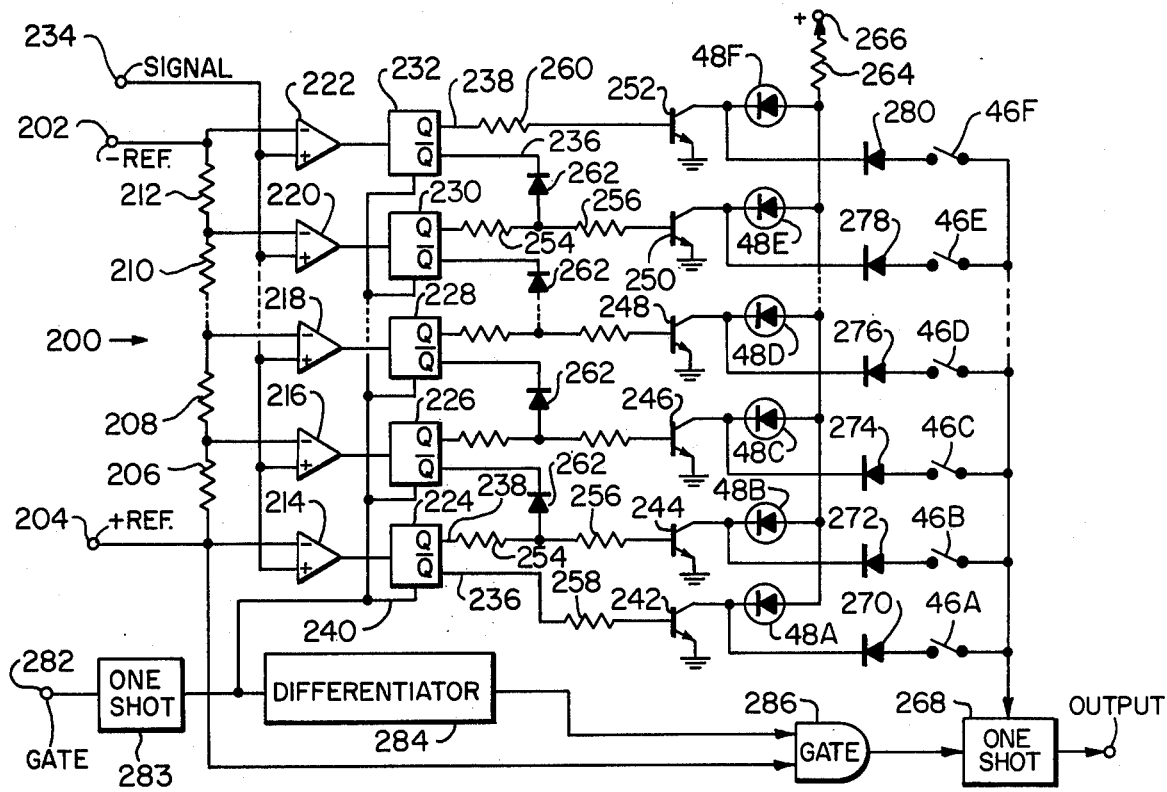
FIG. 11 illustrates a modification of the invention referred to hereinafter as the multiple discriminator or indicator circuit.

FIG. 11 indicates a preferred form of the indicator circuit. This circuit is the same circuit utilized in the system described in U.S. Pat. No. 3,802,252. It is to be understood, as indicated by the broken lines in FIG. 11, that the number of signal processing channels described below can be varied according to the desired degree of proportional indications of can pressure. The circuit of FIG. 11 is preferably in the form of an analog to digital converter and comprises a voltage divider network 200 arranged to provide signal inputs to a plurality of signal processing channels. Divider network comprises two input terminals 202 and 204 across which is connected a series of suitably valued resistors 206 – 212. Input terminals 202 and 204 are connected respectively to DC negative and positive reference voltage sources. Where the circuit is not provided with its own reference voltage sources the positive and negative voltages provided at terminals 148 and 150 of the voltage supply 146 (FIG. 9) can be utilized. As shown, the circuit also comprises five operational amplifiers 214 – 222 and five bistable latching semiconductor memory units 224 – 232. Amplifier 214 has its inverting or negative input line connected to the positive reference terminal 204. The corresponding input lines of amplifiers 216 – 222 are connected between successive pairs of resistors 206 – 212 while that of amplifier 222 is connected to terminal 202. The direct or positive terminals of amplifiers 224 – 232 are coupled together and connected to a third terminal 234.

The output lines of amplifiers 214 – 222 are connected to the input lines of memory units 224 – 232, respectively. By way of example, the array of memory units may consist of a plurality of type SN7475 modules produced by Texas Instruments of Dallas, Tex. Each memory unit has two output lines 236 and 238 and is enabled or disabled according to the level of the signal appearing on its control line 240 (in fact, each memory has two control lines which are energized by a common control signal, but only one control line is shown for the sake of drawing simplicity). The construction of these memory units is such that if the signal on control line 240 goes to a logic high state, the signal level on output lines 238 and 236 will go to logic high and low states respectively if the signal on the input line goes to a logic high state; and will go low and high, respectively, if the signal on the input line goes to a logic low state. If the signal on control line 240 goes low, the memory is latched, i.e., the signals on output lines 236 and 238 will stay as they are and are unaffected by subsequent signal changes on the input line.

The memory units are interconnected and coupled to light driving transistors 242-252. Output lines 238 of memory units 224-230 are connected by duplicate pairs of resistors 254 and 256 to the bases of transistors 244-250 respectively, while the respective lines 236 and 238 of memory units 224 and 232 are connected by resistors 258 and 260 to bases of transistors 242 and 252, respectively. The junction of resistors 254 and 256 associated with memory unit 224 is connected by a diode 262 to the output line 236 of memory unit 226. Corresponding diode coupling is effected between successive ones of the memory units 226-232.

The emitters of transistors 242-252 are grounded while their collectors are connected to the cathodes of light-emitting diodes 48A-F, respectively. The anodes of these diodes are connected via a dropping resistor 264 and a terminal 266 to a positive DC voltage supply (not shown). The collectors of transistors 242-252 are also connected in parallel to the input line of a one-shot multivibrator 268 via separate diodes 270-280 and toggle switches 46A-F.

The circuit of FIG. 11 also includes an input terminal 282 which is connected to the enabling input of a one-shot gate 283 which in turn has its output connected to the control lines 240 of the memory units and also to a differentiator 284. The latter in turn is connected to one of the input lines of an AND gate 286. Gate 286 has a second input line that is connected to the positive DC reference voltage terminal 204, while its output line is connected to an enable input terminal of the one-shot 268. The output line of one-shot 268 is connected to the solenoid of air valve 62 (FIG. 5) so as to provide a driving signal.

Operation of the circuit of FIG. 11 will now be described in connection with inspection of cans having a flexible end wall swelled due to a positive excess pressure. The negative and positive reference signals appearing at terminals 148 and 150, respectively, and the signal output at terminal 134 (FIG. 9) are applied to terminals 202, 204 and 234, respectively. The output of the proximity sensing switch 66 is applied to terminals 282. The amplifiers 214-222 will each produce an output when the signal voltage on their direct line exceeds the reference voltage on their inverting line. The reference voltage inputs applied to the inverting lines of the amplifiers differ incrementally because of the voltage divider 200 so that amplifier 216 requires a greater signal at terminal 234 than amplifier 214 to produce an output. Similarly, amplifiers 218, 220 and 222 each require respectively greater signal levels at terminal 234 to produce an output. The output lines 238 of memory units 224-232 will go high when a gating signal is impressed on their control lines 240 and an input of suitable level is received from the amplifiers 214-222, respectively. If the signal at terminal 234 is insufficient to cause the line 238 of memory unit 224 to go high, transistor 242 will conduct and thereby activate the LED 48A. If the signal at terminal 234 is high enough to cause line 238 of memory unit 224 to go high, line 236 will go low and transistor 242 will not activate LED 48A but transistor 244 will conduct to activate LED 48B. If the signal at terminal 234 is high enough to cause line 238 of memory unit 226 to go high, transistor 256 will conduct to activate LED 48C. At the same time, line 236 of memory unit 226 will go low, causing the voltage at the junction of resistors 254 and 256 between memory unit 224 and transistor 244 from conducting enough to operate LED 48B. Similarly, if the signal at terminal 234 is sufficient to cause the line 238 of memory unit 228 to go high but not high enough to cause the line 238 of memory input 230 to go high, LED 48D will go on and the LEDs 48A-C will stay off. A still higher signal at terminal 234 is required to turn on LED 48E. LED 48F is turned on when the output line 238 of memory unit 232 goes high. Thus which LED is turned on depends on the level of the signal at terminal 234, which in turn depends on the amount of deflection of the can end that is being measured. The higher the pressure level in the can, the greater the deflection of the measured end and the more positive will be the signal level at terminal 234. Hence the light-emitting diodes 48A-F provide relative or proportional indications of the pressure level in the cans. By observing which of the diodes 48A-F are activated, an operator can determine the degree of "goodness" of cans being tested and can determine the frequency of occurrence of a bad can or whether there is any upward or downward trend in can pressures. Switches 46A-F allow the operator to select which cans are acceptable and which are not. If one of these switches is closed and the associated one of transistors 244-252 is rendered conductive as a result of the measurement of a can, the closed switch will cause a signal to appear on the input line to the one-shot 268. At the same time gate 286 will produce an enabling signal for the one-shot, with the result that the latter will energize the solenoid of valve 62 and cause the rejector mechanism to reject the can from the conveyor. It is to be noted that the differentiator 284 delays operation of gate 286 until the end of the gate pulse period. This is essential since the circuits operate during the gate period. Applying the positive reference signal at terminal 204 to the gate 286 assures that the one-shot 268 will not fire unless a significant voltage, indicative of the deflection of a can wall, is generated by the discriminator circuit.

In practice, one type of container may be acceptable over a large range of pressures while another type of container may be acceptable only within a small range of pressures. Further, where the center of the range of acceptable pressures may be at a high pressure level for one container, the center of the range of acceptable pressures of another container may be low. The circuit 106 (FIG. 9) can be adjusted to take this factor into account. More specifically, adjustment of potentiometer 142 adjusts the offset voltage applied to the positive input terminal of the scaling amplifier 130. By raising or lowering this offsetting voltage, the output of amplifier 130 and thus the valve of the signal provided at terminal 134 to terminal 234 (FIG. 11) can be scaled up or down in order to change the level of the center pressure level of the range of acceptable pressures as well as take into account normally curved walls, such as lid 10 (FIG. 1), etc. By adjusting potentiometer 160 of the voltage source 146, the negative DC reference voltage at terminal 148 (FIG. 9) applied to terminal 202 (FIG. 11) can be varied with respect to the positive DC reference voltage at terminal 150 (FIG. 9) applied to terminal 204 (FIG. 11). This increases or decreases the voltage spread across the voltage divider 200 so that the voltage increments necessary to provide an output from each succeeding one of the amplifiers 214–222 (and thus energize LEDs 48A–48F) can be varied. The range of deflections and thus pressures can be thus taken into account by adjustment of the potentiometer 160.

In operation, the inspection unit 38 is adjusted on pedestal 42 so that the deflection measuring unit 20 is positioned just above cans 24 as they pass on conveyor belt 22. The operator determines the range of pressures that are acceptable and the center pressure of the range, and adjusts the potentiometers 142 and 160 accordingly. He then closes whichever ones of the switches 46 that are connected to LEDs 48 that are turned on in response to signals generated by the deflection of nonacceptable cans. For example, referring to FIG. 12 if cans having a positive pressure are acceptable in the range shown in the right hand portion of the curve and a monitoring unit 40 having nine switches 46 and a corresponding number of LEDs 48 is employed, the number 1, 7, 8 and 9 switches are closed. Thus the pressures which produce soft swells in containers which are measured to provide a voltage output at the terminal 134 of FIG. 9 and applied to terminal 234 of the circuit of FIG. 11 will be acceptable so long as the voltage does not fall below to energize the first LED 48 or in the alternative to provide a great enough voltage so as to energize the 7th, 8th or 9th LED.

It will be appreciated that the present invention overcomes the testing ambiguities experienced by the taptone system previously described. Where the end of the can being measured is of the same tension at two different pressures very clearly the amount of deflection will be different at these two pressures. Thus, the voltage measured at terminal 234 will be different.

Figure 12:
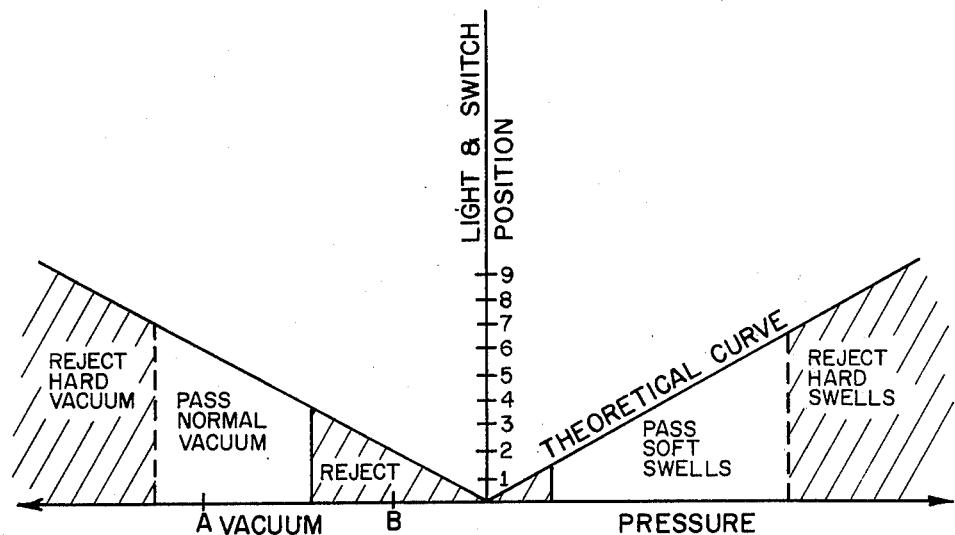
FIG. 12 is a graphical illustration useful in explaining the operation of the embodiment employing the circuit of FIG. 11.

The other testing ambiguity as experienced by testing lids such as lids 10 shown in FIG. 1 and graphically illustrated in FIG. 2 can be easily resolved using the present invention. Specifically, referring to the left portion of the curve in FIG. 12 the vacuum at pressure B (taken from FIG. 2) which is unacceptable is shown in the reject portion of a theoretical curve while the vacuum at pressure A (also taken from FIG. 2) is shown in the pass portion of the curve. In order to test this type of can, potentiometers 142 and 160 are appropriately set and as shown in FIG. 12 switches 1, 2, 3, 7, 8 and 9 are closed. As shown in FIG. 12 a can having a vacuum at B will energize LED 3, and since the switch is closed will also energize the solenoid so that the can is rejected. On the other hand a can having a vacuum A will not energize the LED 6 since the switch 6 is opened so that the can is allowed to continue on belt 22.

Referring to FIG. 13 it can be shown that the present invention is easily adaptable to be used in conjunction with the system described in U.S. Pat. No. 3,802,252. The electromagnetic pulse system is shown generally in FIG. 13 at 300 and includes a proximity sensing switch 302 which when sensing the presence of a can 24 energizes a transducer drive coil 304. When the transducer is driven the can is struck with a magnetic pulse of force to cause the can to vibrate freely and thereby generate an acoustic ping which is sensed by a transducer pick-up 306. Since the frequency of the acoustic ping is a function of the internal pressure in the container, the frequency spectrum of the signal output of the transducer pick-up is examined by the frequency discriminator circuit 308 which determines if the signal output contains selected frequencies at an energy level indicative of a desired pressure level. In accordance with the teachings of the U.S. Pat. No. 3,802,252 this information would normally be applied as a voltage signal to the indicator circuit or A-D converter 200 (previously described) which energizes lights 48 and energizes the reject actuator 56 to reject the container if the container is a bad can. However, in using the electromagnetic pulse system with the present invention, the sensors 92 and circuits 94 are connected to the circuit 106 as previously described but the output of circuit 106 is connected through a buffer 310 to the inputs of the A-D converter 200 in a manner as described hereinbefore. The output of discriminator 308 is also connected through the buffer 310 to the input of the A-D converter 200. Further the proximity sensing switch 66 is connected to the A-D converter (terminal 282) so that the A-D converter can also be energized and lights 48 activated. The sensors 92 and the transducer drive and pick-up 304 and 306 respectively can be positioned adjacent one another above conveyor belt 22. As the cans pass under the sensors 92 and the transducer drive 304 and pick-up 306 the two systems can be operated in succession in order to benefit from their particular advantages. By testing with the sensors 92 and circuits 94 as well as circuit 106 in accordance with the teaching of the present invention, the testing ambiguities experienced by the prior art system can be overcome.

It will be appreciated that various modifications can be made to the present invention without departing from the scope of the invention. For example, the shields 96 shown in FIG. 6 which are used to prevent interference between the sensors 92A, 92B and 92C can be omitted and the sensors connected to a commutator switch 320 as shown in FIG. 14. The latter has three inputs which are connected to receive signals A, B and C from the outputs of circuits 94A, 94B and 94C respectively. The commutator also has three outputs which are respectively connected to the inputs 100, 102 and 104 of the circuit 106. Commutators are old in the art and thus commutator 320 will not be described in great detail. As is well known, a commutator is a switching device for transmitting in a repetitive manner a plurality of signals from a corresponding number of inputs through a single channel to a corresponding number of outputs in a repetitive manner so that the signals do not interfere with one another. Thus, commutator 320 is adapted to transmit the signal A from the output of circuit 94A to input terminal 100 during one instant, the output signals B from the output of circuit 94B to input terminal 102 at another instant, and the output signal C from the output of circuit 94C to the input terminal 104 of circuit 106 at yet another instant. Preferably, the commutator 320 is devised so as to apply the signals in the following repetitive sequence: A B C B A B C B A, etc. This sequence is preferred since the signals A and c represent the reference signals while signal B represents the information signal to which signals A and C are compared. Thus, the repetition sequence providing a sampling of the information signal for each sampling of one of reference signals A and C tends to make available a relatively greater amount of signal information from signal B. It will be appreciated when using commutator 320 that although signals A, B and C are applied to the respective inputs 100, 102 and 104 at different instances of time, the individual input capacitors 110A, 110B and 110C (See FIG. 9) can be designed to store the signals for a sufficient amount of time so that all the signals will be applied to the inputs of the amplifier 114 simultaneously.

Another modification of the present invention is described with reference to FIGS. 15 and 16. In these Figures the sensing unit 20A is essentially the same as unit 20 shown in FIG. 6 and 7, except that the sensing coils 92A and 92C together with the circuits 94A and 94C have been replaced with an annular coil 92D and a corresponding oscillator circuit 94D. Specifically, the end plate 88A is provided with an annular groove 90D which completely surrounds the sensing coil 92B. The coil 92D is wound in the annular groove so as to preferably be in coaxial relationship with the sensing coil 92B and so that the faces 95B and 95D of the coils are coplanar. Terminal posts are suitably provided for connecting the ends of the coil 92D to the inputs of circuit 94D. Sensing coil 90D operates in the same manner as the sensing coils 90A–90C. However, a detected object absorbs an average amount of energy between the annular end face 95D of coil 92D and the object. Thus the output of circuit 94D will be essentially the same as that shown in the graph of FIG. 8 except that the voltage will be indicative of the average distance of the gap between the annular face 95D of the coil 94D and the end wall 25. In this way the average distance is determined by the energy field and need not be determined at the input of circuit 106. Accordingly, the output circuit 94D is connected to both of the input terminals 100 and 104, the latter two being connected together.

Another possible modification is to change the system of FIG. 13 by replacing proximity detectors 66 and 302 with a single sensor which is connected to initiate operation of transducer 304 and also control operation of the circuit of FIG. 11. In such case, a delay determined as a function of the speed of the belt 22, would have to be utilized to sequentially operate the sensing coils 92 and the transducer drive 304.

A significant advantage of the invention is that it is not limited to the inspection of sealed metal cans but also may be used to inspect containers made of glass or other materials that are sealed by a metal cap or lid. Furthermore, it is not necessary to measure the deflection of the lid, cap or end wall of the container. Instead it is possible to measure the deflection or curvature of a flexible side wall of a vacuum or positive pressure packed container. The important thing is to measure the curvature of a wall of the container which is flexible to the extent that it will deflect as a function of the internal pressure of the container.

Various other modifications will be obvious without departing from the scope of the invention herein involved. It is intended that all matter contained in the above description or shown in the accompanying drawings shall be interpreted in an illustrative and not a limiting sense.

What is claimed is:

1. Apparatus for monitoring the internal pressure within an enclosure having at least a flexible wall portion comprising:

first sensing means for measuring the distance between at least a first point on said flexible wall portion and said first sensing means and for providing in response thereto a first electrical signal, said first electrical signal being proportional to the distance between said first point and said first sensing means;

second sensing means for measuring the average of the distances between at least two other points on said flexible wall portion spaced from said first point and said second sensing means and for providing in response thereto a second electrical signal, said second electrical signal being proportional to the average of said distances between said at least two points and said second sensing means; and means for comparing said first and second electrical signals and for providing in response to said comparison a third electrical signal, said third electrical signal being substantially proportional to the difference between said first and second electrical signals and substantially linearly proportional to the amount of deflection of said flexible wall portion.

2. Apparatus in accordance with claim 1 wherein said first sensing means includes a first sensing coil for generating a first energy field and said second sensing means includes at least a second sensing coil spaced with respect to said first coil for generating a second energy field.

3. Apparatus in accordance with claim 2 wherein said first sensing coil is disposed in a coaxial relationship with and said second sensing coil.

4. Apparatus according to claim 3, wherein said average of said distances is determined by said second energy field.

5. Apparatus in accordance with claim 2, wherein said second sensing means further includes a third sensing coil and the axes of said first, second and third sensing coils are disposed in parallel relationship to one another and said coils substantially lie in the same plane.

6. Apparatus in accordance with claim 5 wherein said axes of said second and third coils are disposed equidistant from the axis of said first coil.

7. Apparatus in accordance with claim 6 wherein said first, second and third coils are disposed in a straight line.

8. Apparatus in accordance with claim 5 wherein said second and third sensing coils generate two electrical signals representative of the distances between said coils and the two other points on said flexible wall respectively and further including means for averaging said two electrical signals so as to provide said second electrical signal.

9. Apparatus in accordance with claim 8 further including means for preventing the energy fields of each of said coils from interfering with one another.

10. Apparatus in accordance with claim 9 wherein said last-mentioned means includes at least two arcuate plates, each of said plates being spaced from one another and positioned between two of said coils.

11. Apparatus in accordance with claim 9 wherein said last-mentioned means includes means for commutating said first electrical signal and each of said two electrical signals.

12. Apparatus in accordance with claim 2 further including means for shielding each of said coils from one another.

13. Apparatus in accordance with claim 1 further including means for scaling said third electrical signal so as to take into account the normal curvature of said flexible wall.

14. Apparatus in accordance with claim 1 further including means for indicating the value of said third electrical signal.

15. Apparatus in accordance with claim 14 wherein said third electrical signal is an analog signal and said means for indicating the value of said third electrical signal includes an analog-to-digital converter.

16. Apparatus in accordance with claim 15 wherein said means for indicating the value of said third electrical signal includes a meter.

17. Apparatus in accordance with claim 1 wherein said first and second sensing means are positioned proximate a conveyor for conveying containers to be inspected and are disposed so that successive containers may be monitored one at a time and means for enabling said apparatus each time the flexible wall of said container is positioned within a predetermined distance of said first and second sensing means.

18. Apparatus in accordance with claim 17, further including means for selectively rejecting containers on said conveyor according to the amount of deflection of said flexible wall portion.

19. Apparatus according to claim 1, wherein said first sensing means includes a first sensing coil for generating said first electrical signal, said second sensing means includes second and third sensing coils for generating two electrical signals representative of the distances between said coils and the respective two other points, and said second sensing means includes means for averaging said two electrical signals, wherein said first and two electrical signals each have a value determined in accordance with the same linear functional relationship with measured distance.

20. Apparatus according to claim 1, wherein said first electrical signal is substantially linearly proportional to the distance between said first point and said first sensing means, said second electrical signal is substantially linearly proportional to said average of said distance; and said third electrical signal is substantially linearly proportional to the difference between said first and second electrical signals.

21. A method for monitoring the pressure within a sealed container having at least a resilient wall portion, comprising the steps of:
measuring the distance between a first point on said flexible wall portion and first sensing means;
producing a first electrical signal in response to the measurement of said distance with said first electrical signal being substantially proportional to the distance between said first point and said first sensing means;
measuring the average distance between at least two other points of said flexible wall portion and a second sensing means;
producing a second electrical signal in response to the measurement of said average distance, said second electrical signal being substantially proportional to the average of said distances between said two other points and said second sensing means;
comparing said first and second electrical signals; and
producing a third electrical signal in response to the comparison, said third electrical signal being substantially proportional to the difference between said first and second signals and substantially linearly proportional to the amount of curvature of said flexible wall and indicative of the pressure within said container.

22. A method in accordance with claim 21 wherein said step of measuring the average distance between at least two points of said flexible wall portion and said second sensing means includes the steps of generating two signals respectively representative of the distance between each of said two points and said second sensing means and averaging said two signals.

23. A method in accordance with claim 21 wherein said step of measuring the average distance between at least two points of said flexible wall and said second sensing means comprises the steps of generating a field between said second sensing means and portions of said flexible wall portion including said two points, and measuring the average field strength of said field.

24. A method in accordance with claim 21 further including the steps of:
electrically energizing a transducer coil in order that said coil will generate an electromagnetic pulse of force on said resilient wall portion when said resilient wall portion is positioned proximate to said transducer coil so that said resilient wall portion is caused to vibrate at a resonant frequency which is a function of the pressure in said container;
producing a fourth electrical signal in response to and oscillating as a function of the vibrations of said vibrating wall portion;
frequency discriminating said fourth electrical signal within a predetermined range of frequencies to determine the resonant frequency of said vibrating wall portion indicating the magnitude of the pressure within said containers as a function of said resonant frequency so as to give an independent indication of the pressure within said container.

25. The method according to claim 21, wherein said first electrical signal is substantially linearly proportional to the distance between said first point and said first sensing means, said second electrical signal is substantially linearly proportional to said average of said distances; and said third electrical signal is substantially linearly proportional to the difference between said first and second electrical signals.

26. In an apparatus for monitoring the internal pressure within containers having at least a resilient wall portion for providing an output indicative of whether the magnitude of said pressure conforms to a predetermined standard and comprising (1) a transducer coil, (2) means for electrically energizing said coil so that said coil will generate an electromagnetic pulse of force on the resilient wall portion of one of said containers when the resilient wall portion of said one container is positioned proximate to said transducer coil, whereby said resilient wall portion is caused to vibrate at a frequency which is a function of the pressure in said container, (3) pickup means adjacent said transducer coil for producing signals in response to and oscillating as a function of the vibrations of said vibrating wall portion, (4) frequency discriminator means for receiving and discriminating said signals within a predetermined range of frequencies to determine the resonant frequency of said vibrating wall portion, and (5) indicator means responsive to said frequency discriminating means for selectively indicating whether the magnitude of the pressure within said containers conforms to said predetermined standard, the improvement comprising:
first sensing means for measuring the distance between at least a first point on said flexible wall portion and said first sensing means for providing in response thereto a first electrical signal, said first electrical signal being substantially proportional to the distance between said first point and said first sensing means;
second sensing means for measuring the average of the distances between at least two other points on said flexible wall portion spaced from said first point and said second sensing means and for providing in response thereto a second electrical signal said second electrical signal being substantially proportional to the average of the distances between said at least two other points and said second sensing means; and means for comparing said first and second electrical signals and for providing in response to said comparison a third electrical signal said third electrical signal being substantially proportional to the difference between said first and second signals and substantially linearly proportional to the amount of deflection of said flexible wall portion so as to give an independent measurement of said internal pressure with each of said containers;

wherein said indicator means is further responsive to said third signal for selectively indicating whether the amount of deflection of said flexible wall portion conforms to within a predetermined range of values.

* * * * *

UNITED STATES PATENT OFFICE
CERTIFICATE OF CORRECTION

PATENT NO. : 4,117,718

DATED : October 3, 1978

INVENTOR(S) : Gary G. Hayward

It is certified that error appears in the above-identified patent and that said Letters Patent are hereby corrected as shown below:

Claim 3, column 16, line 24, delete the word "and".

Claim 26, column 18, line 62, after the word "means" insert the word -- and --.

Signed and Sealed this

Nineteenth Day of December 1978

[SEAL]

Attest:

RUTH C. MASON
Attesting Officer

DONALD W. BANNER
Commissioner of Patents and Trademarks